April 15, 1924.
D. J. CRONIN
1,490,888
APPARATUS FOR AND METHOD OF PRODUCING A FINISHED COAT ON STRIPS OF METAL
Filed Jan. 9, 1922        2 Sheets-Sheet 1
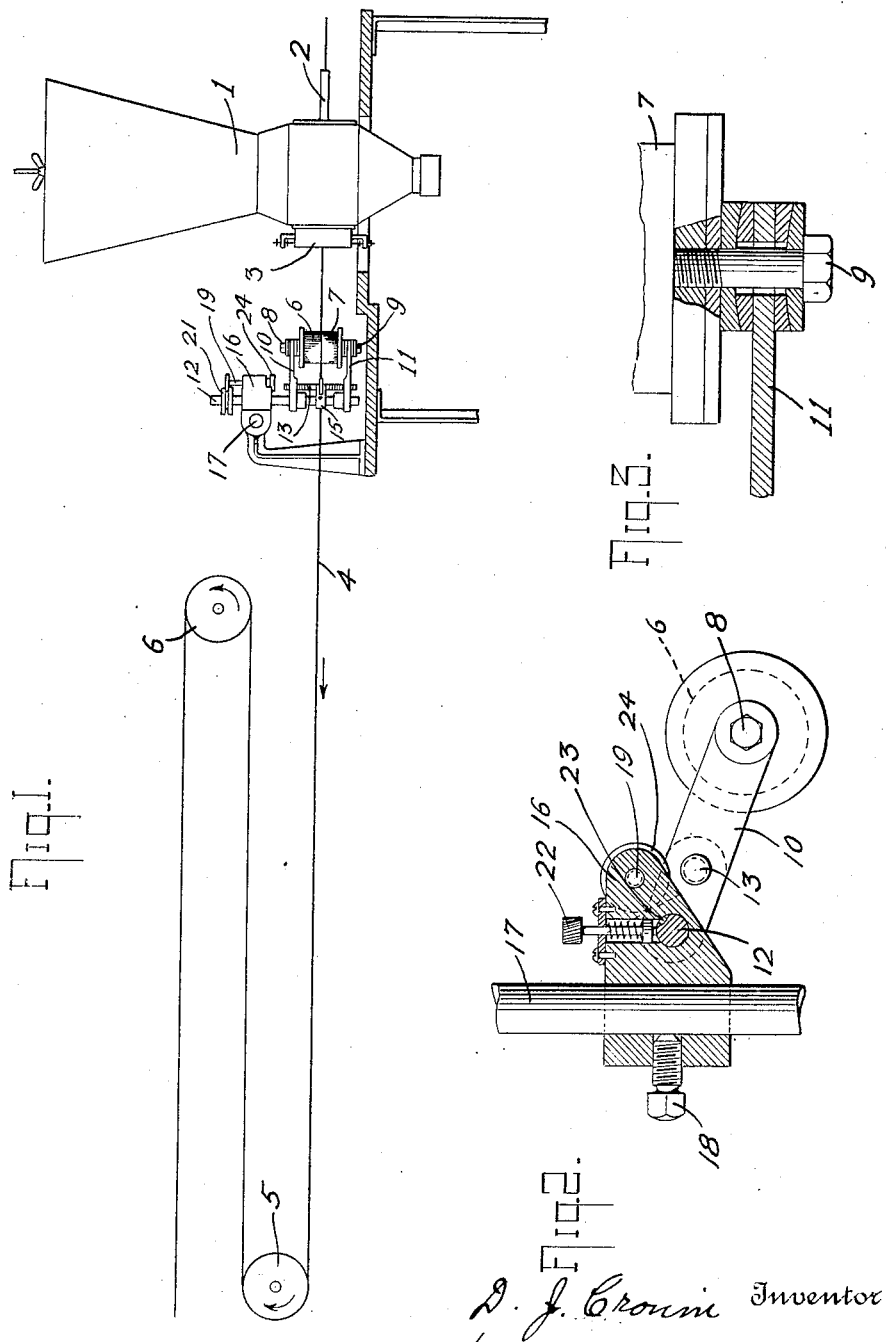

April 15, 1924. 1,490,888
D. J. CRONIN
APPARATUS FOR AND METHOD OF PRODUCING A FINISHED COAT ON STRIPS OF METAL
Filed Jan. 9, 1922 2 Sheets-Sheet 2
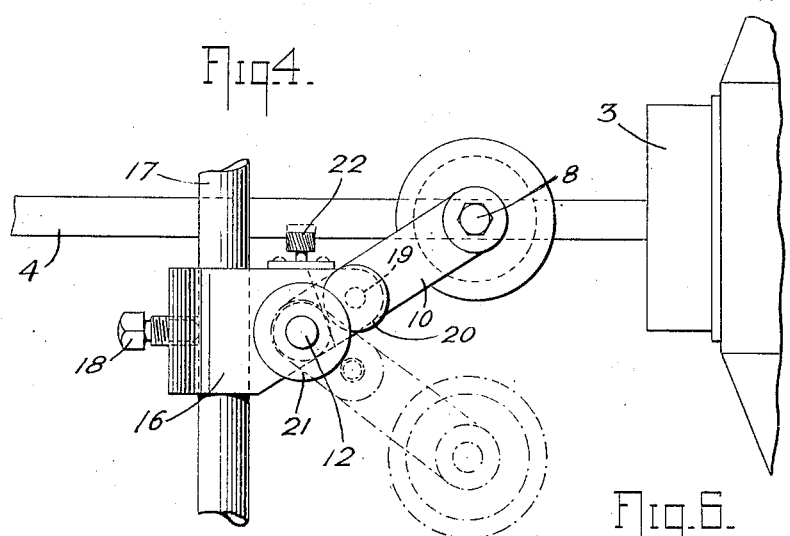
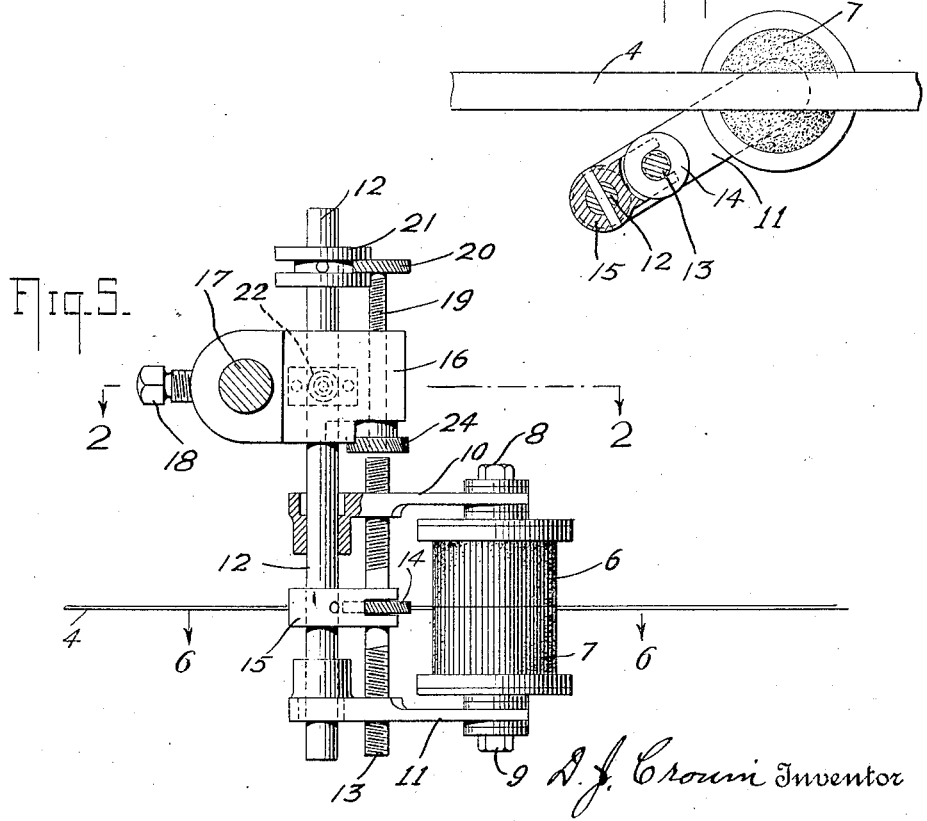

Patented Apr. 15, 1924.

1,490,888

UNITED STATES PATENT OFFICE.

DANIEL J. CRONIN, OF DERBY, CONNECTICUT, ASSIGNOR TO THE BASSETT METAL GOODS COMPANY, INC., OF DERBY, CONNECTICUT, A CORPORATION OF CONNECTICUT.

APPARATUS FOR AND METHOD OF PRODUCING A FINISHED COAT ON STRIPS OF METAL.

Application filed January 9, 1922. Serial No. 528,114.

*To all whom it may concern:*

Be it known that I, DANIEL J. CRONIN, a citizen of the United States, residing at Derby, county of New Haven, State of Connecticut, have invented certain new and useful Improvements in Apparatus for and Methods of Producing a Finished Coat on Strips of Metal, of which the following is a full, clear, and exact description.

My invention relates to improvements in apparatus for and method of producing a finished coating on strips of metal with celluloid or the like and has for its object to provide means for and method of producing on such coated strips a pleasing finish which shall improve their appearance and add to their commercial value. A further object is to provide means for and method of applying such a finish without materially adding to the manufacturing cost of the product.

The following is a description of an embodiment of my invention, reference being had to the accompanying drawings, in which—

Fig. 1 is a diagrammatic view of an apparatus embodying my invention;

Fig. 2 is a plan view of certain features of my invention, a clamp being shown in section on the line 2, 2, Fig. 5;

Fig. 3 is a detail showing the connection of a brush member used in embodying my invention;

Fig. 4 is a plan view of certain features of my invention upon an enlarged scale;

Fig. 5 is a side elevation of the attachment shown in Fig. 4; and,

Fig. 6 is a sectional view on the line of the plane 6, 6, Fig. 5.

Referring more particularly to the drawings, 1 is a container for the material to be applied as a coating; said container being shown in detail in Patent No. 1,230,151, granted to Edgar Guichard, June 19, 1917. 2 is a guide forming part of said container and 3 is a die holder. 4 is a strip of steel which passes through the guide and die and over pulleys 5 and 6, so spaced as to afford ample time for the coating upon the steel to harden. Closely adjacent to the die of the container 1, are two brushes 6 and 7 mounted on axes 8 and 9, in arms 10 and 11, which are carried by a shaft 12. Through the arms 10 and 11 passes a rod 13 having its ends screwthreaded in opposite directions and carrying a knurled wheel 14 which engages arms on a member 15 rigidly secured to the shaft 12 so as to definitely locate the arms 10 and 11 relatively to the shaft 12. By turning the screw threaded rod 13, the brushes 6 and 7 can be adjusted toward and from one another as desired, so as to make the desired contact with the strip 4 and vary their striation forming action. The rod 12 is carried by a block 16 adjustably secured to a horizontal rod 17 by a set-screw 18. The rod 12 is adjustable relatively to this block by means of a screw 19 making engagement with the block 16 and having a disc 20 which lies between two discs 21 rigidly secured to the shaft 12. By turning the screw 19 in one direction or the other, the shaft 12 together with the brushes 6 and 7, can be raised and lowered so as to make the brushes 6 and 7 bear equally hard upon the two sides of the steel 4. The shaft 12 can be swung about its axis from the position shown in full lines in Fig. 4, to the position shown in dotted lines; that being desirable when a strip is first threaded through the container, or if, for any reason, it is desired at any time to withdraw the brushes 6 and 7 from the sides of the steel 4. The brushes are held in the position shown in full lines in Fig. 4 by a spring-pressed detent 22, the end of which rides in a groove 23 in the shaft 12, so that while it prevents axial movement of the shaft, it does not interfere with its longitudinal movement. The screw 19 when adjusted can be locked in position by the locknut 24.

In operating my apparatus, a strip, such for instance as corset steel, is threaded through the guides and die of the container 1. As this strip passes through the die of the container 1, it has received a coating of plastic celluloid, such as forms the base for moving picture films or other similar rapidly hardening material adapted to form a durable and flexible coating, the container 1 being filled with such material in a pasty condition. It then passes between the brushes 6 and 7, which make superficial contact with its flat surfaces; then over the idler rollers 5 and 6; the brushes 6 and 7 being adjusted so as to apply a substantially equal pressure to both surfaces, of a strength which will produce a finely striated grained or lined surface upon the flat surfaces of the plastic coating of the corset steel by a superficial action. The brushes are preferably made of bristles. When made from bristles, as distinguished from brushes in pad form, they should be fairly stiff. If the stiffness is about that of a shoe brush or a fairly soft tooth brush, as distinguished from a soft camel's hair brush, the results are satisfactory. The brushes are located adjacent to the die, as shown in Fig. 4, at a point close enough to the dies so that the celluloid is still in a plastic state at the time it passes through the brushes and so as to receive and retain striations produced thereby. The strip of steel being drawn continuously through the container and between the brushes, is continuously lined superficially and after it is thoroughly dried, is cut up into the desired lengths and tipped or otherwise finished at its ends, preferably by dipping the ends into liquid celluloid. The product is a superficially hair-lined coated strip.

The brushes 6 can be turned upon their axes by loosening the bolts 8 and 9 and then clamped in adjusted positions so that the contacting brush surface can be changed from time to time.

I preferably form these brushes with axes which are in line with one another so that fresh surfaces can be secured by turning the brushes about the aligning axes, this construction being a simple construction and effective for my purposes and requiring the minimum amount of space for brushes making a given contact.

As will be evident to those skilled in the art, my invention permits of various modifications without departing from the spirit thereof or the scope of the appended claims.

What I claim is:

1. The method of producing a striated coating on a metallic strip which consists in applying a coating of rapidly hardening plastic material to both sides of said strip and subjecting the outer surfaces of said coating, while still plastic, to the superficial action of brushes contacting therewith so as to produce fixed striations thereon and subsequently drying said coating.

2. The method of producing a striated coating on a flat metallic strip which consists in applying a coating of plastic celluloid to both sides of said strip and subjecting said coating, while plastic and in a condition to take and retain striations, to the superficial action of brushes contacting with the flat surfaces of said coating so as to produce striations thereon and subsequently drying said coating.

3. The method of producing a striated coating on a thin metal strip which consists in applying a coating of rapidly hardening plastic material to both sides of said strip and thereafter subjecting said coating when in a condition to take and retain striations to the superficial action of striation producing brushes contacting with the surfaces of said coating on opposite sides of said strip so as to produce striations thereon.

4. In an apparatus for producing a surface striated coating on flat metallic strips, means for applying rapidly hardening plastic material such as plastic celluloid to a flat metallic strip so as to form a coating thereon in combination with striation forming brushes adapted to superficially contact with the flat surfaces of said coating after said strip leaves said coating means and form superficial striations confined to said surfaces, said brushes being located relatively to said coating means at a point where the coating is in condition to receive surface striations from the action of said brushes and retain the striations so received.

5. In an apparatus for producing a surface striated coating on flat metallic strips, means for applying rapidly hardening plastic material such as plastic celluloid to a flat metallic strip so as to form a coating thereon in combination with striation forming brushes adapted to superficially contact with the flat surfaces of said coating after said strip leaves said coating means and form superficial striations confined to said surfaces, said brushes being located relatively to said coating means at a point where the coating is in condition to receive surface striations from the action of said brushes and retain the striations so received in combination with means for adjusting one of said brushes toward and from the other to vary the striation forming action, and means for adjusting said brushes simultaneously in either direction relatively to the plane of said strip.

DANIEL J. CRONIN.